United States Patent
Cooper et al.

(10) Patent No.: US 9,244,923 B2
(45) Date of Patent: Jan. 26, 2016

(54) HYPERVIDEO BROWSING USING LINKS GENERATED BASED ON USER-SPECIFIED CONTENT FEATURES

(75) Inventors: Matthew L. Cooper, San Francisco, CA (US); Scott Carter, Los Altos, CA (US); John Adcock, San Francisco, CA (US); Andreas Girgensohn, Palo Alto, CA (US); Qiong Liu, Milpitas, CA (US); Frank M. Shipman, III, College Station, TX (US); Lynn Donelle Wilcox, Palo Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 156 days.

(21) Appl. No.: 13/566,084

(22) Filed: Aug. 3, 2012

(65) Prior Publication Data

US 2014/0040273 A1 Feb. 6, 2014

(51) Int. Cl.
*G06F 17/30* (2006.01)
(52) U.S. Cl.
CPC ...... *G06F 17/3002* (2013.01); *G06F 17/30014* (2013.01)
(58) Field of Classification Search
CPC .................. G06F 17/3002; G06F 37/30014
USPC .......................................................... 707/741
See application file for complete search history.

(56) References Cited

U.S. PATENT DOCUMENTS

| | | | |
|---|---|---|---|
| 6,072,542 A | 6/2000 | Wilcox et al. | |
| 6,774,917 B1 | 8/2004 | Foote et al. | |
| 6,915,009 B2 | 7/2005 | Foote et al. | |
| 7,246,314 B2 | 7/2007 | Foote et al. | |
| 7,356,830 B1 * | 4/2008 | Dimitrova | 725/51 |
| 7,555,718 B2 | 6/2009 | Girgensohn et al. | |
| 7,783,106 B2 | 8/2010 | Cooper et al. | |
| 2001/0014891 A1 * | 8/2001 | Hoffert et al. | 707/104.1 |
| 2008/0288537 A1 | 11/2008 | Golovchinsky et al. | |
| 2009/0216719 A1 * | 8/2009 | Coffman et al. | 707/3 |
| 2010/0067863 A1 * | 3/2010 | Wang et al. | 386/4 |
| 2010/0186041 A1 * | 7/2010 | Chu et al. | 725/46 |
| 2011/0081075 A1 | 4/2011 | Adcock et al. | |
| 2011/0255384 A1 * | 10/2011 | Hindle et al. | 369/30.08 |
| 2012/0330950 A1 * | 12/2012 | Pichumani et al. | 707/736 |

OTHER PUBLICATIONS

Boissiere, G. "Automatic creation of hypervideo news libraries for the World Wide Web", ACM Hypertext 1998, pp. 279-280.

(Continued)

*Primary Examiner* — Grace Park
(74) *Attorney, Agent, or Firm* — Sughrue Mion, PLLC (57) ABSTRACT

A method for generating content links between a first digital file and a second digital file by detecting a content feature of a first digital file segment of the first digital file during playback of the first digital file segment of the first digital file, searching an index of a plurality of content features for a plurality of segments including a second digital file segment of the second digital file, and dynamically generating a link between the first digital file one segment of the first digital file and the second digital file segment of the second digital file when a content feature of the first digital file segment of the first digital file is related to the content feature of the at least one segment of the second digital file.

18 Claims, 6 Drawing Sheets

(56) References Cited

OTHER PUBLICATIONS

Fitzgibbon, A.. et al., "On Affine Invariant Clustering and Automatic Cast Listing in Movies," 7th European Conference on Computer Vision (vol. 3, pp. 304-320), 2002 doi:10.1007/3-540-47977-5_20 http://www.cs.cmu.edu/~efros/courses/AP06/Papers/fitzgibbon-eccv-02.pdf.

Arandjelovic, O., et al., :Automatic face recognition for film character retrieval in feature-length films 2005, Computer Vision and Pattern Recognition, 2005. CVPR 2005. IEEE Computer Society Conference on (vol. 1, pp. 860-867). IEEE. http://mi.eng.cam.ac.uk/reports/svr-ftp/oa214_CVPR_2005_paper2.pdf.

Galmar, E., et al., "Spatiotemporal semantic video segmentation," IEEE Workshop on Multimedia Signal Processing (pp. 574-579) Oct. 8-10, 2008. doi:10.1109/MMSP.2008.4665143 http://www.image.ece.ntua.gr/papers/561.pdf.

Kim, M., Kumar, et al., "Face tracking and recognition with visual constraints in real-world videos." Computer Vision and Pattern Recognition, 2008. CVPR 2008. IEEE Conference on (pp. 1-8). IEEE. http://www.sanjivk.com/faceTracking.pdf.

Peker, K.A.. et al., "Broadcast video program summarization using face tracks," IEEE ICME 2006.

Satoh, S., "Comparative evaluation of face sequence matching for content-based video access," International Conference on Automatic Face and Gesture Recognition, 2000. (pp. 163-168). http://ieeexplore.ieee.org/xpls/abs_all.jsp?arnumber=840629.

Sivic, J, and A Zisserman. "Video Google: A Text Retrieval Approach to Object Matching in Videos." IEEE International Conference on Computer Vision. IEEE, 2003. 1470-1477. http://www.robots.ox.ac.uk/~vgg/publications/papers/sivic03.pdf.

Smith, J. et al., "An orthogonal taxonomy for hyperlink anchor generation in video streams using OvalTine", ACM Hypertext 2000, pp. 11-18.

Tantaoui, M.A., et al. "Interaction with Broadcast Video," Proceedings of ACM Multimedia 2002, pp. 29-38, Juan-les-Pins, France, Dec. 1-6, 2002.

VideoClix, VideoClix Authoring Software, http://www.videoclix.com/videoclix_main.html, accessed Mar. 15, 2012.

Vivek Singh, Jiebo Luo, Dhiraj Joshi, Phoury Lei, Madirakshi Das, Peter Stubler, "Reliving On Demand: A Total Viewer Experience", ACM International Conference on Multimedia, 2011.

Zollman, D.A., et al. "Teaching and Learning Physics with Interactive Video," http://www.phys.ksu.edu/perg/dvi/pt/intvideo.html, accessed Mar. 15, 2012.

De Rooji, O, and Worring, M. "Browsing Video Along Multiple Threads" IEEE Transactions on Multimedia, vol. 12 (2), p. 121-130, 2010.

Javascript Library for Real-Time Video Effects: https://github.com/brianchirls/Seriously.js/wiki, accessed Aug. 2, 2012.

VideoClix Company Profile: http://www.crunchbase.com/company/videoclix , accessed Aug. 2, 2012.

VideoClix TV website: http://www.videoclix.tv/, accessed Aug. 2, 2012.

Videoclix authoring software demo video at http://www.youtube.com/watch?v=zWfr0dSwyO8 accessed.Aug. 2, 2012.

Picasa Photo Organization tool: http://picasa.google.com/, accessed Aug. 2, 2012.

Facebook photo tagging: https://www.facebook.com/blog.php-?post=467145887130, accessed Aug. 2, 2012.

VideoSurf: http://www.videosurf.com/, accessed Aug. 2, 2012.

\* cited by examiner

HYPERVIDEO BROWSING USING LINKS GENERATED BASED ON USER-SPECIFIED CONTENT FEATURES

BACKGROUND

1. Technical Field

Aspects of the example embodiments are directed to browsing for a digital video, and more specifically, using a link generated based on a content feature to browse for the digital video.

2. Description of Related Art

Usually, when browsing resources for content during open-ended information searching tasks, users must locate and synthesize ideas and concepts found across various resources. Within the context of textual material, browsing may combine alternatingly quickly skimming and intensively reading multiple documents. In practice, users need to be able to search and examine multiple documents simultaneously.

Related art video interfaces have been developed with an expectation that the user views a single video at a time, except in specific situations that require synchronized video streams (e.g. security surveillance). Such related art video interfaces may suggest an additional video to the user based on its similarity to the entire video currently being viewed. For example, a video may be suggested based on similar titles, or other similar text associated with the video (e.g. author, or abstract).

Alternatively, in the related art, a video may be suggested based on similar characteristics between the viewer and other viewers who have expressed a preference about the video, or have watched the video. Additionally, in the related art, a video may be suggested based on similarity of the metadata associated with the video. However, these suggestions are based on complete videos, and the related art systems do not support access to portions or segments within the video. Moreover, the similarity is judged with little or no context. Further, the only feature of the context that is used to generate suggestions is a recent or currently watched video of the user.

Related art video search sites suggest a related video based on metadata associated with the entire single video. Further, these related art search sites rely on author pre-defined web links or behavioral information of the author and/or viewer.

The related art systems provide links to related videos (and other media) which are reflective of the video content, in particular of named people appearing in those videos. However, linking is from a whole video to another whole video, rather than from one segment of a video to another segment of a single video. Further, linking is performed based on manually defined (i.e., by an author or a viewer) textual metadata.

One related art system presents video segments using a browsing interface where one axis (e.g., the horizontal axis) is time (i.e., temporal closeness), and another axis (e.g., the vertical axis) indicates content-based similarity. In this system, the user can navigate in any chosen dimension (e.g., in either the temporal dimension or the content-based dimension) from the current position. However, this related art system is strictly limited to segment-based analysis and relies on a "thread model" where frames are only organized linearly. As used herein, "thread model" means that the user can only navigate to the next closest object in any given dimension (i.e., the user can choose to go to the next/previous shot in time, the next/previous shot in relevance to the current search, visual similarity, text transcript similarity, automatically-determined concept similarity). In this related art system, there is no facility to allow the user to select the region of the video which is important. More generally, in this related art system, there is no way to add explicit feedback to the query dynamically. For example, to update recommendations by adding a text term, the entire query session needs to be reinitiated, which in turn changes all rankings (per thread) that appear in the interface. Existing related art systems do not allows for a more incremental approach to exploration by accumulating aspects of interest to the user while reviewing results.

A related art content-based video processing system has an object designated in one frame that can have its other occurrences in the video recalled. However, this system merely creates a custom timeline based on appearances of an object within one source video, and is merely an offline proof of concept system, which is not interactive. For instance, an object may appear at multiple times and in multiple scenes throughout a movie. This related art system allows a user to "recall" or be presented with other portions of the movie where the object appears. However, this related art system does not provide linking between different videos, and bases linking upon detected object appearance, not other content-measures. There is no actual interactive system presented and only linking is proposed with visual (SIFT) features based on entire frames or sub-frames.

Another related art system sequences a digital photo slide-show using metadata, but does not determine similarity between segments within the slide show, or navigation between these segments. This related art system sequences digital photos and relies only on metadata to establish photo similarity and re-rank the photos, but does not disclose sequencing videos or does not providing direct navigation between photos.

Yet another related art system allows users to select an object in a video and attach a link to the object. More specifically, the object is tracked throughout the video, and the link persists as long as the object is in the video. However, the link must be manually specified by the user, and is not determined automatically.

Another related art system user interface for playing hypervideo (aka "hyperlinked video"; "A displayed video stream containing embedded, clickable anchors") is provided. During playback, pre-authored video hyperlinks appear statically in the interface, and the user can follow the static hyperlinks. However, hyperlinks are not dynamically generated.

SUMMARY

Aspects of certain embodiments include a method of generating content links between a first digital file being played back and a second digital file by creating an index of features of content containing a feature of content of a segment of the first digital file and a feature of content of a segment of the second digital file; detecting the feature of content of the segment of the first digital file during playback of the segment of the first digital file; and dynamically generating a link between the segment of the first digital file and the segment of the second digital file when the feature of content of segment of the first digital file is related to the feature of content of the segment of the second digital file.

Aspects of the example embodiments further include a computer-readable medium having stored therein executable instructions for generating content links between a first digital file being played back and a second digital file, by creating an index of features of content containing a feature of content of a segment of the first digital file and a feature of content of a segment of the second digital file; detecting the feature of content of the segment of the first digital file during playback of the segment of the first digital file; and dynamically generating a link between the segment of the first digital file and the segment of the second digital file when the feature of content of the segment of the first digital file is related to the feature of content of the segment of the second digital file.

Aspects of the example embodiments further include a computing device comprising storage and a processor for generating content links between a first digital file being played back and a second digital file, by creating an index of features of content containing a feature of content of a segment of the first digital file and a feature of content of a segment of the second digital file; detecting, the feature of content of the segment of the first digital file during playback of the segment of the first digital file; and dynamically generating a link between the segment of the first digital file and the segment of the second digital file when the feature of content of the segment of the first digital file is related to the feature of content of the segment of the second digital file.

BRIEF DESCRIPTION OF THE DRAWINGS

The accompanying drawings, which are incorporated in and constitute a part of this specification exemplify the example embodiments and, together with the description, serve to explain and illustrate principles. Specifically.

DETAILED DESCRIPTION

In the following detailed description, reference will be made to the accompanying drawing(s), in which identical functional elements are designated with like numerals. The aforementioned accompanying drawings show by way of illustration and not by way of limitation, specific embodiments and implementations consistent with principles of an example embodiment. These implementations are described in sufficient detail to enable those skilled in the art to practice an example embodiment and it is to be understood that other implementations may be utilized and that structural changes and/or substitutions of various elements may be made without departing from the scope and spirit of an example embodiment. The following detailed description is, therefore, not to be construed in a limited sense. Additionally, the various embodiments of the invention as described may be implemented in the form of software running on a general purpose computer, in the form of a specialized hardware, or combination of software and hardware.

Example embodiments of this application may encompass browsing multiple related videos on a common topic. Examples of the multiple related videos may include, but are not limited to, a collection of presentation videos (e.g. a slide presentation including presentation slides) on image retrieval, a collection of how-to-videos on patching a hole in the wall, or a collection of home videos from a birthday party. In such example embodiments, the user may play a video from the collection and may pause the video when more or different related information is desired. The example embodiments may suggest links to locations (e.g. a specific time or a specific frame or a specific portion of a frame) in a related video based on the content of the paused frame. For example, a user may have a collection of presentation videos (e.g. a presentation including one or more presentation slides) on image retrieval. If the user pauses the video on a slide of the presentation describing, for example, Scale-Invariant Feature Transform (SIFT) features, other videos that discuss SIFT features will be suggested.

Alternatively, if the user has searched for videos on how to patch a hole in a wall and pauses on a frame showing use of a joint knife, locations (e.g. a specific time or a specific frame or a specific portion of a frame) in other videos showing similar joint knife action will be suggested.

Alternatively, in the case of home videos, the user might be watching one of several videos taken at a party, and may pause the video on a close up of a particular person. In this situation, other videos showing the same person may then be suggested.

Additionally, the user may select one of the recommended related videos, and that video may be played beginning from the linked location (e.g., a specific time or a specific frame or a specific portion of a frame).

In another example embodiment, the user can pause the video and select content in the frame to specify what features should be matched to make the suggestions more accurate. For example, in a presentation video, the user might select a word or phrase on the current slide. In another example embodiment, the user might select an object of interest in a how-to-video. In another example embodiment, the user might select a face in the video in a home video. In these example embodiments, a link may then be suggested based on the selected item.

Examples of selection could include positioning a cursor over an item being displayed (e.g., by manipulating a mouse), or performing a touch action on an item being displayed, or generating a bounding box around an item being displayed. In some example embodiments, it may not be necessary to pause the video to select content in the frame (i.e., on-the-fly).

In an example where the user suggests a word in the video, Optical Character Recognition (OCR) can be performed and links to related videos may be suggested based on the user suggested keyword. In an example where an object is selected, links may be suggested based on SIFT features. In an example where a person is selected, the link may be based on similar features (e.g. face). In an example, the type of link may be selected based on the video collection. For example, a presentation video might use text links, a how-to video might use object links with SIFT features, and a home video might use face links based on face recognition features. Alternatively, the user could also specify the link type when selecting content to be matched.

To support real-time interaction, an index may be generated once the collection of videos is specified. For example, in a collection of presentation videos, slides may be extracted, OCRed, and indexed. In an alternative example, in a collection of home videos (e.g., a birthday party), face detection may be performed on each frame of each home video and the face features stored. In this example, similar faces across frames (e.g., consecutive) may be merged and an index created for each face. In an example for a collection of how-to videos, SIFT features are computed either for each frame of the video segment or for selected frames from each video segment.

User Interface

Figure 1:
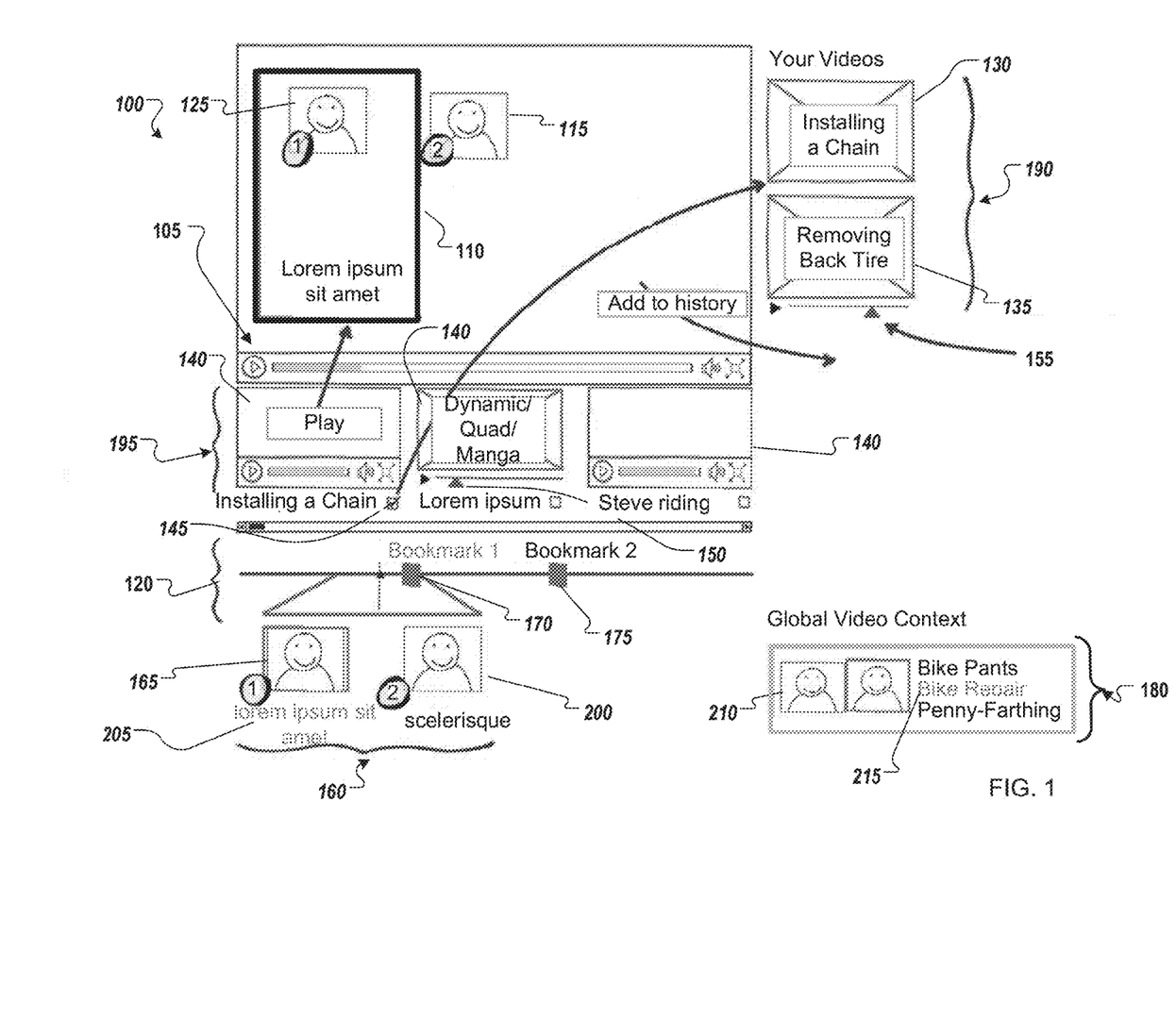
FIG. 1 illustrates a user interface according to an example embodiment.

FIG. 1 shows a user interface 100 to browse and view videos. The user interface 100 has a main video player window 105 with a timeline 120. The timeline 120 may have bookmarks 170, 175 created by the video author. A plurality of areas (160,180, 190, 195) surrounding the player window 105 provide access to other videos shown as keyframes 140 (e.g. a frame selected from the video). If the user selects on a keyframe 140, the video 130 corresponding to the keyframe appears in the main video player window 105, and the previous video 135 is included in the collection of videos that have been watched, or are on the list to be watched.

One of the areas surrounding the player window 105 is the user's collection 190 (e.g. "Your videos" in FIG. 1). The user's collection 190 may represent both a list of video segments 130 to be watched and a history of video segments 135 that have previously been watched. In the present embodiment, video segments enter the user's collection 190 only by request from the user. Since the video suggestions are suggested dynamically, a user may select a suggested video before playback of the video in the main player window 105 is completed. In such a situation, the video being played in the main player window 105 is moved to the history of video segments 135. Later, the user may select the previously watched video from the history of video segments 135. Further, the history of video segments 135 may allow videos to be played back beginning from a point 155 where the user previously stopped or paused the previously viewed videos shown in the user's collection display 190.

The second area 195 surrounding the player window 105 is the suggested video area, where related videos are suggested. These suggestions for other videos 140 are related to the video currently being watched in the main player window 105 and to previously watched videos 135. In one example embodiment, the user may select a suggestion to be played immediately. Alternatively, an object such as a check box 145 may allow the user to add the suggested video to the list of video segments that have been queued to be watched 130.

The third area 160 consists of the timeline 120 and information 165, 200 (such as faces or text phrases) extracted based on the content 115, 125 of the video being played back in the main video player 105 at the current playback position. In one example embodiment, the user can select the extracted content information by selecting the images 165, 200, or displayed text 205 from the region below the timeline 120. Alternatively, the user may generate an object such as a bounding box 110 in the main video player window 105. Items extracted from within the bounding box 110 may be marked 165 as selected and shown below the timeline. The user could also select the title of an author-created bookmark 170 to indicate its relevance.

The fourth area 180 in FIG. 1 is a "Global Video Context" area 180 that may contain faces or objects 210 and text phrases 215 for the entire video. For example, this fourth area 180 may contain information such as the title or text phrases extracted from the abstract accompanying the video. While these global items (faces/objects 210 and text phrases 215) by themselves may not provide suggestions, they can used in combination with local items (e.g., images/faces 165, 200, and text 205) extracted from segments of the video during playback. For example, the global word "bike" may be used in combination with a local word "wheel" to find video segments about "bike wheels." In some example embodiments, the user may be given the option to deselect global items.

Representations of video segments can take several forms. A sample keyframe 140 may be an image from the video, either from the playback position or one that represents the video segment. Alternatively in some example embodiments, a keyframe collage combining several keyframes from the video segment may be used as a representation of the video segment. Examples of such keyframe collages can be in the form of a quad collage, a mini-Manga collage, a Stained Glass collage, or any other combination of images to form a collage as would be known to a person of ordinary skill in the art. A simple quad display may be more suitable for small images than a Manga collage with more cells or a Stained Glass collage.

Alternatively in some example embodiments, active keyframes may cycle through several keyframes from the video segment, either all the time or in response to a user gesture such as a cursor-hover, mouse-hover or a stylus-hover.

Alternatively, in some example embodiments, the video player may support playing the suggested video segments 140 in-place (e.g., as a mini player, which is smaller than the main player window 105) without transferring the suggested video segment to the main video player. Controls such as a timeline for the mini player may not need be shown until the user interacts with the mini-player. At the same time, the user may be informed that in-place playback is supported. For example, a mini video player that support playback, may be set up to display one or more keyframes, but when a cursor-hover, or mouse-hover (on the desktop) or stylus-hover (on a tablet) is performed on the keyframe 140, the keyframe may transform into a mini player. Alternatively, in some example embodiments, a long press (a button or object push of extended time duration, as is known to those skilled in the art) on a tablet could start playback or a play button could be provided in a corner of the keyframe. In these example embodiments, a timeline of the mini player may not be visible until a request is made to play the video.

Alternatively, in some example embodiments, instead of providing a mini-video player directly, a hierarchical keyframe browser may be used to find a starting point for the video by providing a plurality of keyframes to allow a user to select a starting point for the video. The browser may be at least three or four images wide to allow browsing a video. An example process might involve scaling the keyframes to use different space from a single keyframe. Alternatively, the keyframe may activate a popup interface (e.g., widget) in response to a user gesture. Alternatively, if the suggested videos 140 include reliable starting points 150 for each suggested video 140, a keyframe browser may not be required.

With respect to finding related content, some example embodiments may also consider operations by the user. For example, pausing a video may be interpreted as indicating a user interest, and playing a segment multiple times may be interpreted as greater interest. Alternatively, selecting extracted items as discussed above may be a stronger indication of interest. These various expressions of interest may be used to emphasize related material based on how the user interacts with the video.

Related Video Suggestion Process—Overview

According to an example embodiment, dynamic generation of links between related content may provide viewing suggestions as a user watches video playback. This dynamic generation may be done by way of automatic analysis that identifies relationships between video segments within the same source video, and between video segments of different source videos. This is done by segmenting videos into units (segments). After segmentation, available features of content (e.g., text or audio features, facial features, or object information extractable from the video, for example) as well as available metadata associated with the video are collected and associated with each corresponding segment in an index.

Related segments may be identified by analyzing the corresponding set or index of content features or metadata and suggested to a user during playback.

Figure 2:
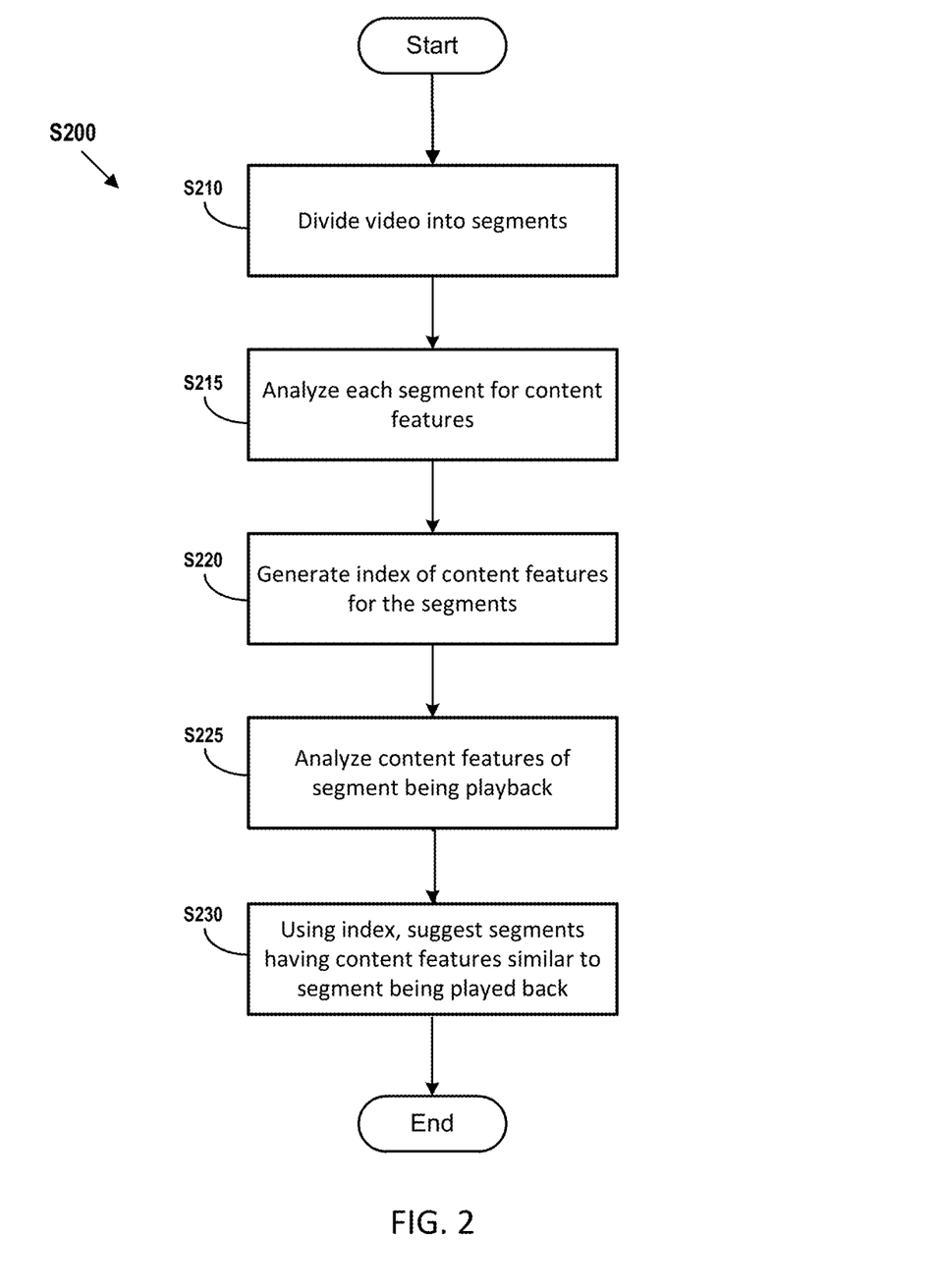
FIG. 2 illustrates a process for suggesting segments according to an example embodiment.

FIG. 2 illustrates an example process S200 for suggesting segments according to at least one example embodiment. At S210, a video is divided into one or more segments. Example processes for segmentation are discussed in more detail below. After a video is divided into one or more segments, each segment is analyzed to extract one or more content features in S215. Example processes for analyzing segments are discussed in more detail below. After each of the one or more segments is analyzed to extract one or more content features, an index of content features of the one or more segments is generated at S220. During playback of a video, the segment currently being played back is analyzed to extract content features at S225. Using the index of content features generated at S220, segments having content features similar to the extracted features of the segment being played back are suggested for playback at S230. The steps of this example process are discussed in more detail below.

Segmentation, Content Feature Extraction and Index Generation—Text in Video

Figure 3:
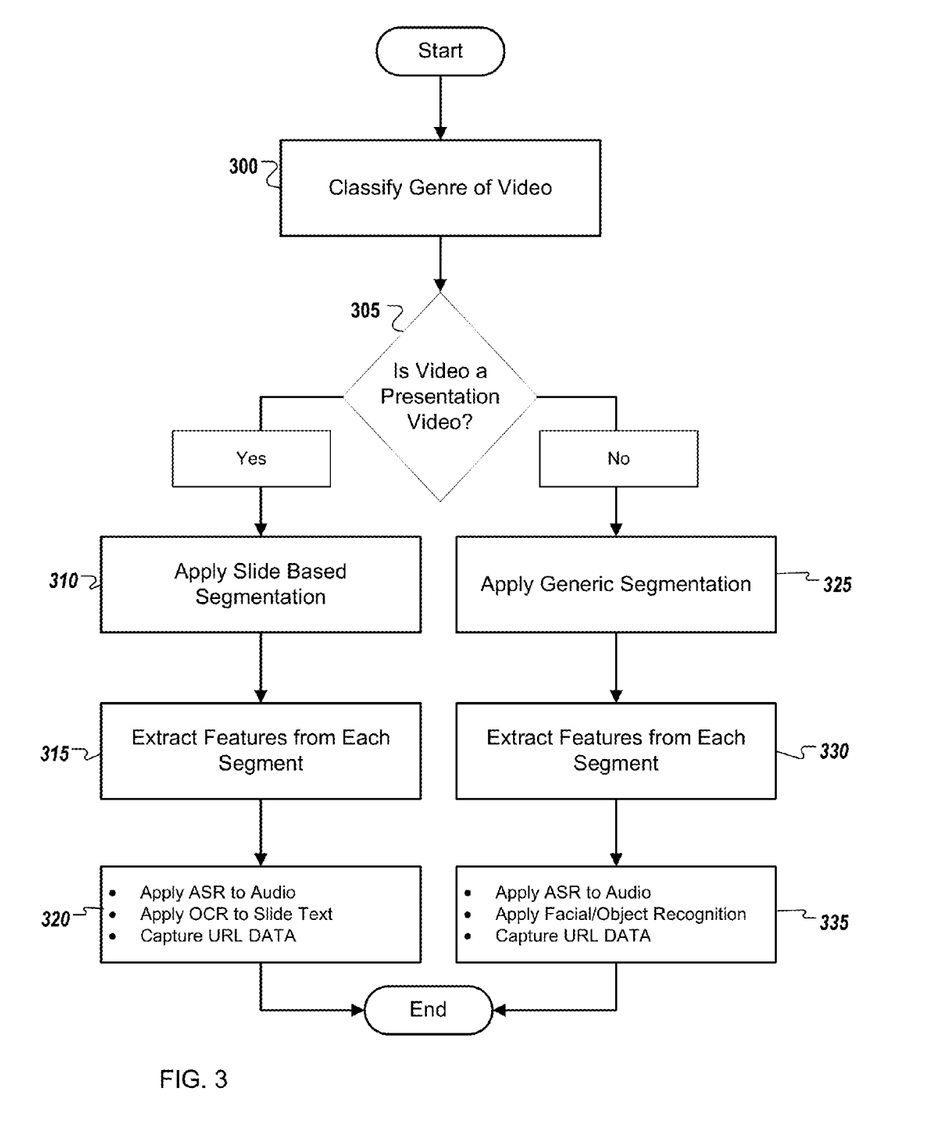
FIG. 3 illustrates a process for dividing a video into segments based on its classification according to an example embodiment.

FIG. 3 provides a flowchart showing an example approach to segmenting a video into units as done in 210 above and then extracting features of content (e.g. text or audio features, facial features, frame sub-region of interest, or object information extractable from the video, for example) from each of the segments as done in 215 above. In this example embodiment of the video segmentation process, an initial genre classification is performed on the video at 300. For example, in one example embodiment, a video may be classified as a presentation video or a non-presentation video. This genre classification may allow dynamic generation of links during the viewing of presentation videos. A known search engine for internet distributed presentation videos (described in U.S. Patent. Pub. 2008/0288537 A1, filed May 16, 2007 the contents of, which is incorporated in its entirety herein by reference) includes an automatic classifier to determine if a video is likely to contain presentation slides. Such a classifier could be used in the first stage (300) of the processing.

After the video is classified, a determination is made at 305 as to whether the video meets a prescribed indicator (e.g. video is a presentation video) and one of two processing paths is followed at 305 based on this determination at 305.

If it is determined at 305 that the video is a presentation video which contains presentation slides (e.g. "Yes" at 305), a slide based segmentation process is applied at 310 and used to divide the presentation into segments. For example, the presentation could be divided into segments, each segment containing a single slide. In some example embodiments, movement in the video can be automatically detected using known techniques to determine slide transitions, or a slide changes to separate the slides. However, as would be apparent to a person of ordinary skill in the art, one or more alternative segmentation processes could also be substituted therefor.

Once the presentation is divided into segments, each segment is analyzed to extract features of content at 315.

Some example embodiments may also use video-level metadata as well as segment-level content features for recommendations of related videos. A frequent source of video-level metadata describing internet distributed video involves the use of text appearing on a video's web page. For example, many videos are accompanied by a description (e.g. title, author) or abstract that can provide useful though limited text for indexing on the video-level indexing. Recommended or similar videos can be made available based on this video-level metadata and user logs. While the detected web page text can provide coarse similarity between videos as a whole, analyzing individual segments or slides may allow assessing similarity between pairs of video segments within a single video or across separate videos. Examples of video level metadata may include but are not limited to, the video title, the video author, text summaries or key words provided by an author and may also include information on where a video was geographically captured (Global Position System (GPS) information for example). User supplied tags or categorization (i.e. from a website such as YouTube) or viewer comments could also be used. For web videos other link-based information can also be used, or any other information at the video's URL.

For each segment, some example embodiments may use OCR techniques at 320 to collect text present on the slide. Additionally, some embodiments may also employ automatic speech recognition techniques (ASR) at 320 to extract voice information. Further, URL text data present on a slide can also be detected at 320 using optical character recognition techniques.

Optionally, some embodiments may also use object recognition techniques or facial recognition techniques as discussed below to detect slide images and process each slide segment for non-text content if, for example, an object of interest appears.

The above segmentation and analysis results in a temporal segmentation of each presentation video based on automatically detected slides. Each slide-based segment is associated with the slide text, spoken text, and URL text as available, as well as any detected slide images to create a search index to be used to generate links and suggest related videos. Any optical character recognition, automatic speech recognition, or object/facial recognition techniques known to a person of ordinary skill in the art could be employed and are not limited to any specific techniques discussed herein.

In another embodiment, a user may indicate text of interest by positioning a cursor over regions in a slide or performing a touch selection on a touch pad or creating a bounding box around text of interest. The OCR techniques can be applied within the detected bounding box, so that specific text extracted by OCR is associated with a spatial region in the given keyframe. Using this information, recommended content based on an automatic word or phrase query against the search index (either across videos or within the present video) may be displayed.

If it is determined at 305 that the video is not a presentation video (e.g. "No" at 305), the video is classified as a non-presentation video. A non-presentation video may not contain slides; therefore, a generic shot segmentation process or a generic shot segmentation algorithm is applied at 325. For example, U.S. Pat. No. 7,783,106, incorporated in its entirety herein by reference, describes a shot segmentation algorithm that could be applied. Alternatively, any shot segmentation algorithm known to one of ordinary skill in the art may be substituted therefor.

Once the video is segmented, content features are extracted from each segment at 330. For such videos, sources of segment-level metadata can include spoken text that is extracted using automatic speech recognition techniques at 335 as discussed above. Further, in some circumstances, such as with videos having broadcast content, closed captioning may also be used as a source of segment level metadata for spoken text at 335.

For user-generated content, there are other possible opportunities for indexing each segment. For example, in some example embodiments biometric data (e.g. facial features) may be detected in the user-generated content and the detected faces used to organize content at 335. Any other analogous approach to organize segments around detected objects can be used. Further, users can identify objects of interest manually by positioning a cursor or performing a touch selection on a touch screen or generating a bounding boxes as discussed above and similar processing then be employed.

An additional source of metadata for all videos may be user-provided bookmarks. For example, bookmarks can be created by the user at various portions. These bookmarks may be linked to text annotations or identified faces or objects, so this information can be readily incorporated as metadata to link together video segments. Further, bookmarks can themselves link directly to other video segments, which may also affect performance of the system.

For the non-presentation videos, OCR can again be applied to the results of generic shot segmentation, can be used to the extent that text is present. For example, text overlays in in broadcast news graphics can be analyzed to identify segments regarding the specific story. Additionally, a banner or ticker displayed along the bottom of the frame that may display text that can be analyzed.

However, in non-presentation videos, frequently no reliable text might be recovered and thus OCR processing of each individual segment may not be useful for providing video recommendations. Though text availability at the segment level may be limited, several options exist to alleviate this problem. One method to overcome text scarcity (discussed in U.S. Patent. Pub. 2008/0288537 A1, filed on May 16, 2007, incorporated in its entirety herein by reference) is using all text within a larger temporal window (e.g. covering multiple segments) to augment the text from an individual segment with the text from temporally near segments. An alternative may be to use multi-level indexing at both the video (or topic) level and the segment level in combination (discussed in U.S. Pat. No. 7,783,106, incorporated in its entirety herein by reference). In this alternative, a hierarchical segmentation may be used to add text in a non-uniform temporal window based on content-based similarity (i.e. topic segmentation).

Both of these approaches may also use a weighting scheme that emphasizes text detected in or temporally near a current segment. Further, a hybrid approach could also use a weighted combination of video-level manually created metadata (e.g. from the video URL) with the automatically extracted text from the video itself with a second weighting to emphasize a current segment of interest. For non-presentation videos, analogous processing can be accomplished by combining generic video shot segmentation with text derived from Automatic Speech Recognition Techniques (ASR) (or closed caption transcripts could be used if available), as would be apparent to a person of ordinary skill in the art.

Segmentation, Content Feature Extraction and Index Generation—Objects in Video

In addition to text based content feature extraction, in an example embodiment related videos may be identified based on similar object features of content. For example, copier repair videos may show multiple views of a same copy machine. In this example embodiment, links to related videos may be generated based on an object selected in the current video, which can be determined based on 2D local features (such as SIFT of the selected object).

In this example embodiment, each video in the collection may be segmented using a shot segmentation algorithm, as discussed above. Objects in each frame of each segment are detected using foreground/background segmentation and tracked throughout the segment. An index for each object in the segment is then created by computing 2D local features in the neighborhood of the object in the video segment. Different weightings may be given to different features based on the number of times an object appears in a video segment. Further, objects in adjacent segments that have similar local features may be merged. Once the index has been created, local descriptors are generated and inserted into an ANN tree or hash table.

In some example embodiments, when the user is interested in an object in a video that is being played back, the user can indicate the object region in the frame (pausing could be performed in some embodiments, but is not necessary). 2D local features for the object selected are then computed in the neighborhood of the object in the video sequence and searched in the ANN tree or hash table. If a match is found, a geometric verification of the matching features may be performed using, for example, a Random Sample Consensus (RANSAC) algorithm to achieve a match based on both the local feature appearance and their geometric relationships. However, the appearance matching is not limited to the use of a RANSAC algorithm, and alternative methods may be used in combination with or as a substitution for the RANSAC algorithm to obtain an appearance match, as would be apparent to a person of ordinary skill in the art.

Content Feature Extraction—Faces in Video

Figure 4:
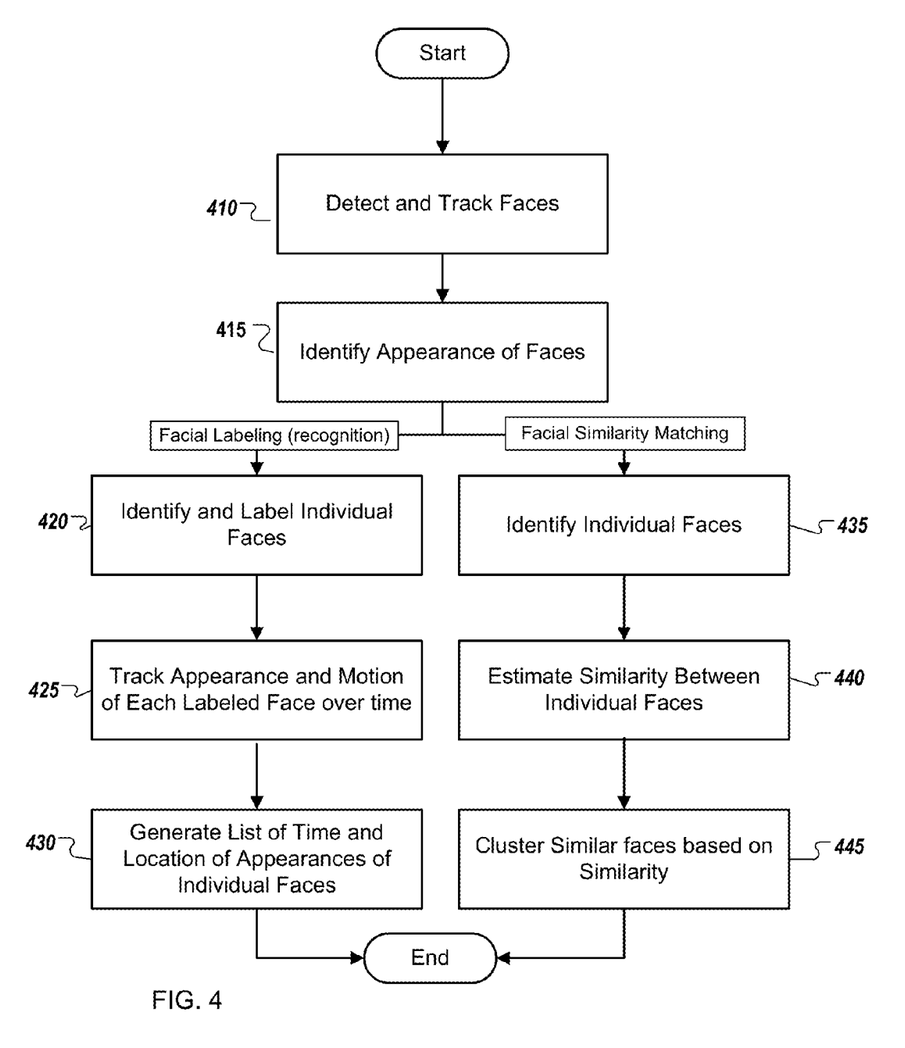
FIG. 4 illustrates a process for detecting facial features and generating an index of video segments based on facial features according to an example embodiment.

In some embodiments, the appearance of people in videos may be informative. Biometric information detection and localization can be considered a special class of object detection, as would be apparent to a person of ordinary skill in the art. One example of a biometric information detection technique may be facial recognition or facial detection. FIG. 4 illustrates an example process for detecting facial features and generating an index of video segments based on facial features according to an example embodiment. By combining face detection with facial recognition, faces appearing in a video can be used to link to other media containing related (similar) faces.

To accomplish this, the appearance of a face in the video must be identified within a video. This involves detecting the appearance of a face (by a face detection method) in at least one frame, and then determining the temporal extent of the face appearance by tracking the appearance or motion of the detected face in the video over time at 410. For example, a face detector may be run on every frame of a video, and faces detected in the same area of the frame in subsequent frames may be grouped together into a single appearance. In an example embodiment, the spatio-temporal tracking of faces in a video can use algorithms known to a person of ordinary skill in the art that have been developed for generic object tracking in video.

In some example embodiments, the result of the face tracking analysis will be a list of the time and location of appearances of individual faces 415. This information may include a complete description of the time and frame coordinates of the face appearance 420, or may be associated with some other segmentation such as a shot-boundary segmentation of the video. Distinct appearances may be linked using face recognition or other visual similarity methods 425. This linking may involve explicitly recognizing named people and associating the names of the recognized entities with the video segments in question 430. In this case, the name assigned to a face may become a category and the name may be linked with other media with a similar category.

Alternatively, links between media may be made by identifying multiple unique appearances 435 of the same person by using a facial similarity metric which may estimate the similarity between multiple face appearances 440 without explicitly labeling by name each face in question. Thus, faces that appear similar but are unlabeled may be linked. This type of similarity metric may be used to cluster various face appearances 445 in a video to combine appearances by the same person within the video, so that the video can be linked by its cast list, rather than a complete unclustered list of face appearances.

Known techniques of facial extraction, facial tracking, facial recognition, and facial clustering known to a person of ordinary skill in the art may be used, and various alternatives apparent to a person of ordinary skill in the art may be substituted therefor.

Content Feature Analysis During Playback and Segment Suggestion

Once all the content features are extracted from each segment, a search index can be created based on the extracted content features as well as available metadata for each of the segments.

During playback, the extracted content features and metadata of the segment being played back can be used to determine similarity using various text categorization and retrieval techniques. For example, extracted features of content associated with the currently playing segment could be used as a query to the search index containing other segments. Based on the query, available segments may be ranked based on text-based similarity (e.g. tf/idf) to be displayed in the interface and possible viewing by the user. Simple linear weightings can be used to combine various attributes such as face presence/absence, location, and event to sequence segments interactively.

Example Computing Devices and Environments

Figure 5:
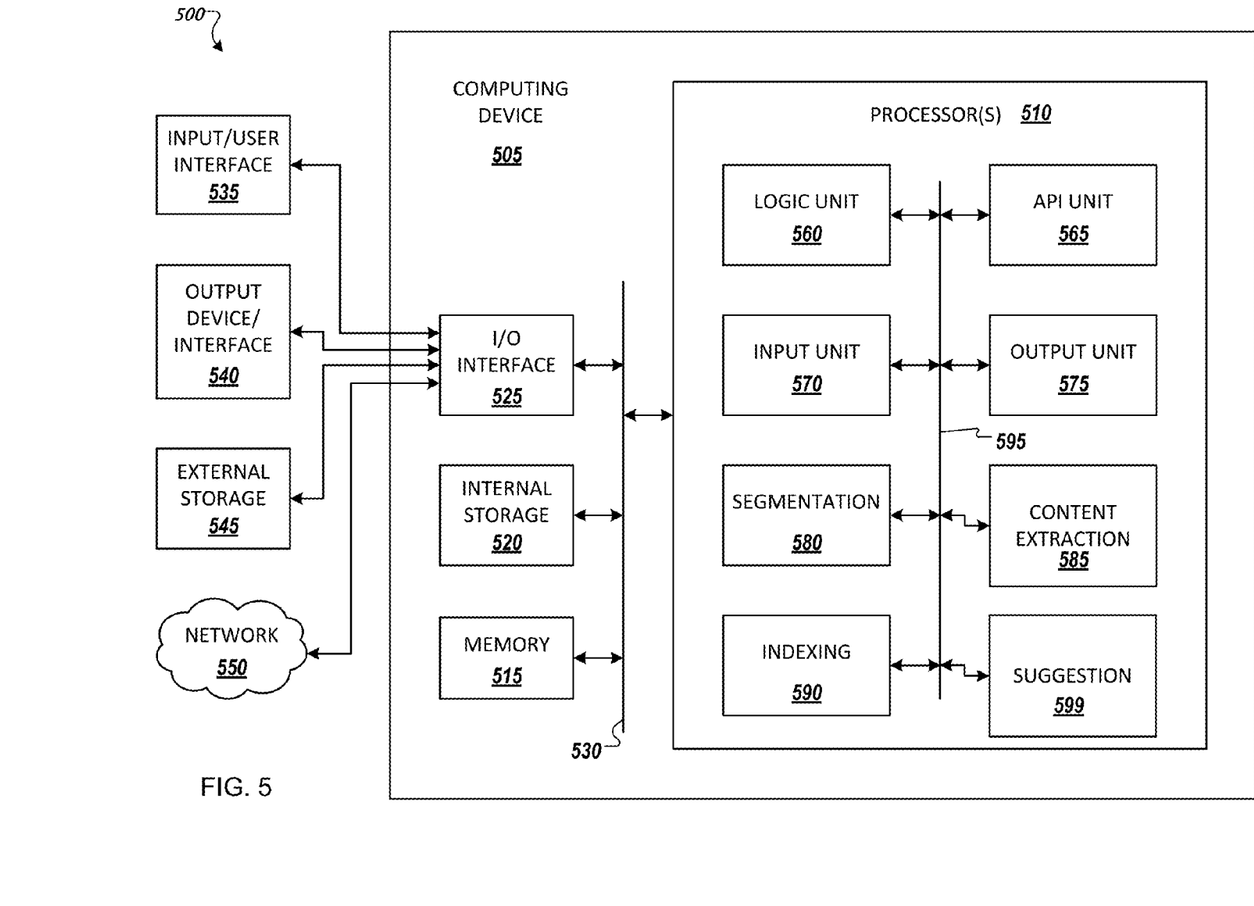
FIG. 5 illustrates an example computing environment with an example computing device suitable for implementing an example embodiment.

FIG. 5 shows an example computing environment with an example computing device suitable for implementing at least one example embodiment. Computing device 505 in computing environment 500 can include one or more processing units, cores, or processors 510, memory 515 (e.g., RAM, ROM, and/or the like), internal storage 520 (e.g., magnetic, optical, solid state storage, and/or organic), and I/O interface 525, all of which can be coupled on a communication mechanism or bus 530 for communicating information.

Computing device 505 can be communicatively coupled to input/user interface 535 and output device/interface 540. Either one or both of input/user interface 535 and output device/interface 540 can be wired or wireless interface and can be detachable. Input/user interface 535 may include any device, component, sensor, or interface, physical or virtual, that can be used to provide input (e.g., keyboard, a pointing/cursor control (e.g. a mouse), microphone, camera, braille, motion sensor, optical reader, and/or the like). Output device/interface 540 may include a display, monitor, printer, speaker, braille, or the like. In some example embodiments, input/user interface 535 and output device/interface 540 can be embedded with or physically coupled to computing device 505 (e.g., a mobile computing device with buttons or touch-screen input/user interface and an output or printing display, or a television).

Computing device 505 can be communicatively coupled to external storage 545 and network 550 for communicating with any number of networked components, devices, and systems, including one or more computing devices of same or different configuration. Computing device 505 or any connected computing device can be functioning as, providing services of, or referred to as a server, client, thin server, general machine, special-purpose machine, or by other label.

I/O interface 525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, satellite network, and the like).

Computing device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 505 can be used to implement techniques, methods, applications, processes, or computer-executable instructions to implement at least one embodiment (e.g., a described embodiment). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 510 can execute under any operating system (OS) (not shown), in a native or virtual environment. To implement a described embodiment, one or more applications can be deployed that include logic unit 560, application programming interface (API) unit 565, input unit 570, output unit 575, segmentation unit 580, content extraction unit 585, indexing unit 590, suggestion unit 599 and inter-unit communication mechanism 595 for the different units to communicate with each other, with the OS, and with other applications (not shown). For example, the Segmentation unit 580, Content extraction unit 585, Indexing unit 590 and suggestion unit 599 may implement one or more processes shown in FIGS. 2, 3 and 4. The described units and elements can be varied in design, function, configuration, or implementation and are not limited to the descriptions provided.

Figure 6:
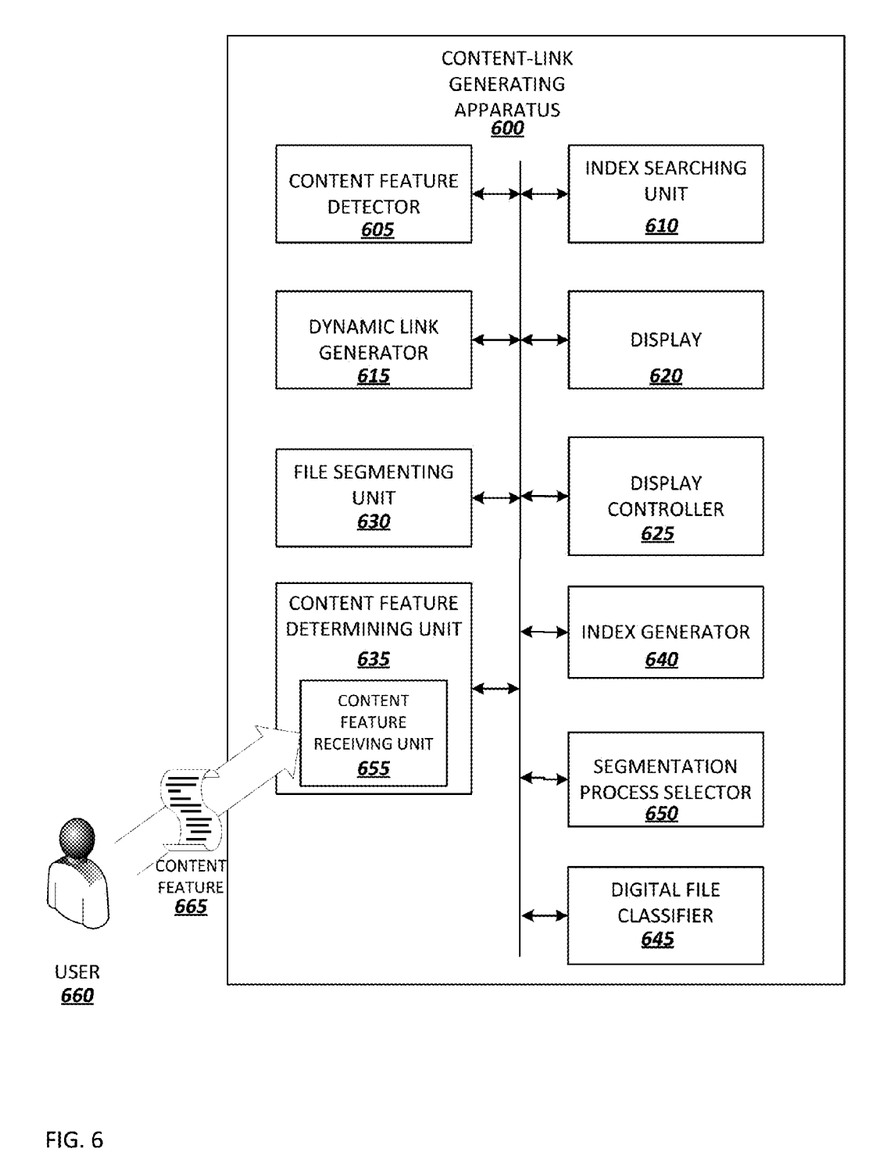
FIG. 6 illustrates an example hardware implementation of an example embodiment.

Though certain embodiments of the present invention may be implemented as software running on, for example, a computer, example embodiments are not limited to software implementations. FIG. 6 illustrates an example hardware implementation of an example embodiment.

In FIG. 6, a content-link generating apparatus 600 is shown. The content-link generating apparatus 600 includes a content feature detector 605, index searching unit 610, dynamic link generator 615, display 620, and display controller 625 all communicatively interconnected. The content feature detector 605 may be configured to detect a content feature of first digital file segment of a digital file during playback of the digital segment of the first digital file using one or more of the processes shown in FIGS. 2, 3, and 4 and discussed above. Similarly, the index searching unit 610 may search an index of content features of a plurality of segments of one or more digital files and the dynamic link generator 615 may generate links between segments of digital filed based when content features of the file segments are related to each other using one or more of the processes shown in FIGS. 2, 3, and 4 and discussed above. Additionally, the display controller 625 may control the display 620 to display a keyframe representing one or more video segments based on the links generated by the dynamic link generator 615. The display 620 is not particularly limited and could include, but is not limited to, a LCD display, an LED display, a Plasma display, and Cathode ray display, etc., as would be apparent to a person of ordinary skill in the art.

Additionally, an example embodiment of a content-link generating apparatus 600 may also include a file segmenting unit 630 that divides a digital file into one or more segments using one or more of the processes shown in FIGS. 2-4 and discussed above. An example embodiment of a content-link generating apparatus 600 may also include a content feature determining unit 635 that determines (or extracts) at least one content feature from one of the segments of the digital file using the processes shown in FIGS. 2-4 and discussed above. Further, an example embodiment of a content-link generating apparatus 600 may also include an index generator 640 that generates an index of content features based on the content features determined (or extracted) from the segments of the digital file using the processes discussed above. Further, an example embodiment of the content feature determining unit 635 may include a content feature receiving unit 655 that receives a content feature 665 selected by a user 660, using one of the processes discussed above.

An example embodiment of a content-link generating apparatus 600 may include a digital file classifier 645 that classifies the digital file using the processes discussed above and shown in FIGS. 2-4 above, and a segmentation process selector 650 that selects a segmentation process (such as the processes shown in FIGS. 2-4 and discussed above) to be used to divide the digital file into segments based on the classification of the digital file.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents.

Aspects related to the example embodiment have been set forth in part in the description above, and in part should be apparent from the description, or may be learned by practice of the invention. Aspects of the example embodiment may be realized and attained by means of the elements and combinations of various elements and aspects particularly pointed out in the following detailed description and the appended claims.

It is to be understood that both the foregoing descriptions are exemplary and explanatory only and are not intended to be limiting.

What is claimed is:

1. A computer-implemented method of generating content links between a first digital file and a second digital file comprising a plurality of digital file segments, the method comprising:
classifying, by at least one computing device, the first and second digital files according to a presentation video classification and a non-presentation video classification;
selecting, by the at least one computing device, for each of the first and second digital files, a first segmentation process in response the digital file being classified into the presentation video classification and a second segmentation process in response to the digital file being classified into the non-presentation video classification;
dividing, by the at least one computing device, the first digital file using the segmentation process selected for the first digital file and the second digital file using the segmentation process selected for the second digital file into the plurality of digital file segments including the first digital file segment and the second digital file segment;
analyzing each digital file segment of the plurality of digital file segments to determine at least one content feature in the digital file segment;
detecting, by the at least one computing device, at least one content feature of a first digital file segment of the first digital file, during playback of the first digital file segment of the first digital file;
searching, by the at least one computing device, an index including for each digital file segment of the plurality of digital file segments (i) information identifying the digital file segment and (ii) content feature association information that identifies the at least one content feature in the digital file segment, to identify a second digital file segment of the second digital file having the at least one content feature of the first digital file segment or at least one content feature related to the at least one content feature of the first digital file segment, using the content feature association information;
dynamically generating, by the at least one computing device, a link between the first digital file segment of the first digital file and the second digital file segment of the second digital file having the at least one content feature of the first digital file segment or the at least one content feature related to the at least one content feature of the first digital file segment, the link being selectable by a user to initiate playback of the second digital file starting at the second digital file segment; and
displaying, by the at least one computing device, a keyframe representing the second digital file segment of the second digital file in response to the dynamic generating of the link between the first digital file segment of the first digital file and the second digital file segment of the second digital file.

2. The method according to claim 1, further comprising:
generating, by the at least one computing device, the index from at least one content feature of the first digital file segment and at least one content feature of the second digital file segment,
wherein the analyzing each digital file segment of the plurality of digital file segments comprises determining, by the at least one computing device, the at least one content feature of the first digital file segment using a recognition process and determining, by the at least one computing device, the at least one content feature of the second digital file segment using the recognition process.

3. The method of claim 2, wherein the first segmentation process comprises dividing at least one of the first and the second digital files into a plurality of segments, each segment comprising a presentation slide, in response to the at least one of the first and second digital file being classified as a presentation digital file comprising at least one slide.

4. The method of claim 2, wherein the second segmentation process comprises dividing at least one of the first and the second digital files into a plurality of segments based on a temporal increment, in response to the at least one of the first and second digital file being classified as a non-presentation digital file.

5. The method according to claim 1, wherein the detecting the at least one content feature of the first digital file segment during playback of the first digital file segment of the first digital file comprises:
  receiving, by the at least one computing device, a content feature selected by the user during playback of the first digital file,
  wherein the receiving the content feature selected by the user during playback of the first digital file comprises at least one of:
    applying, by the at least one computing device, a recognition process to the first digital file segment of the first digital file during which the user has paused the playback of the first digital file, or
    applying, by the at least one computing device, the recognition process to a region of the first digital file segment of the first digital file the user has selected using a user interface.

6. The method according to claim 1, further comprising dynamically generating, by the at least one computing device, a second link between the first digital file segment of the first digital file and the second digital file segment of the second digital file,
  wherein the dynamically generating the second link is performed based on metadata associated with the first digital file segment and the second digital file segment respectively, the metadata comprising at least one of: authorship information, title information, location information, date information and time information.

7. A non-transitory computer-readable medium having stored therein executable instructions for generating content links between a first digital file and a second digital file comprising a plurality of digital file segments, the instructions comprising:
  classifying the first and second digital files according to a presentation video classification and a non-presentation video classification;
  selecting, for each of the first and second digital files, a first segmentation process in response to the digital file being classified into the presentation video classification and a second segmentation process in response to the digital file being classified into the non-presentation video classification;
  dividing the first digital file using the segmentation process selected for the first digital file and the second digital file using the segmentation process selected for the second digital file into the plurality of digital file segments including the first digital file segment and the second digital file segment;
  analyzing each digital file segment of the plurality of digital file segments to determine at least one content feature in the digital file segment;
  detecting at least one content feature of a first digital file segment of the first digital file during playback of the first digital file segment of the first digital file;
  searching an index including for each digital file segment of the plurality of digital file segments (i) information identifying the digital file segment and (ii) content feature association information that identifies the at least one content feature in the digital file segment, to identify a second digital file segment of the second digital file having the at least one content feature of the first digital file segment or at least one content feature related to the at least one content feature of the first digital file segment, using the content feature association information;
  dynamically generating a link between the first digital file segment of the first digital file and the second digital file segment of the second digital file having the at least one content feature of the first digital file segment or the at least one content feature related to the at least one content feature of the first digital file segment, the link being selectable by a user to initiate playback of the second digital file starting at the second digital file segment; and
  displaying a keyframe representing the second digital file segment of the second digital file in response to the dynamic generating of the link between the first digital file segment of the first digital file and the second digital file segment of the second digital file.

8. The non-transitory computer-readable medium according to claim 7, further comprising:
  generating the index from at least one content feature of the first digital file segment and at least one content feature of the second digital file segment,
  wherein the analyzing each digital file segment of the plurality of digital file segments comprises determining the at least one content feature of the first digital file segment using a recognition process and determining the at least one content feature of the second digital file segment using the recognition process.

9. The non-transitory computer-readable medium of claim 8, wherein the first segmentation process comprises dividing at least one of the first and the second digital files into a plurality of segments, each segment comprising a presentation slide, in response to the at least one of the first and second digital file being classified as a presentation digital file comprising at least one slide.

10. The non-transitory computer-readable medium of claim 8, wherein the second segmentation process comprises dividing at least one of the first and the second digital files into a plurality of segments based on a temporal increment, in response to the at least one of the first and second digital file being classified as a non-presentation digital file.

11. The non-transitory computer-readable medium according to claim 7, wherein the detecting the at least one content feature of the first digital file segment during playback of the first digital file segment of the first digital file comprises:
  receiving a content feature selected by the user during playback of the first digital file,
  wherein the receiving the content feature selected by the user during playback of the first digital file comprises at least one of:
    applying a recognition process to the first digital file segment of the first digital file during which the user has paused the playback of the first digital file, or
    applying the recognition process to a region of the first digital file segment of the first digital file the user has selected using a user interface.

12. The non-transitory computer-readable medium according to claim 7, further comprising dynamically generating a second link between the first digital file segment of the first digital file and the second digital file segment of the second digital file,
  wherein the dynamically generating the second link is performed based on metadata associated with the first digital file segment and the second digital file segment respectively, the metadata comprising at least one of: authorship information, title information, location information, date information and time information.

13. An apparatus for generating content links between a first digital file and a second digital file comprising a plurality of digital file segments, the apparatus comprising:
  a digital file classifies that classifies the first and second files according to presentation video classification and a non-presentation video classification;

a segmentation process selector that selects, for each of the first and second digital files, a first segmentation process in response to the digital file being classified into the presentation video classification and a second segmentation process in response to the digital file being classified into the non-presentation classification;

a file segmenting unit that divides the first digital file using the segmentation process selected for the first digital file and the second digital file using the segmentation process selected for the second digital file into the plurality of digital file segments including the first digital file segment and the second digital file segment;

a content feature detector that analyzes each digital file segment of the plurality of digital file segments to determine at least one content feature in the digital file segment and that detects at least one content feature of a first digital file segment of the first digital file during playback of the first digital file segment of the first digital file;

an index searching unit that searches an index including for each digital file segment of the plurality of digital file segments (i) information identifying the digital file segment and (ii) content feature association information that identifies the at least one content feature in the digital file segment, to identify a second digital file segment of the second digital file having the at least one content feature of the first digital file segment or at least one content feature related to the at least one content feature of the first digital file segment, using the content feature association information;

a dynamic link generator that dynamically generates a link between the first digital file segment of the first digital file and the second digital file segment of the second digital file having the at least one content feature of the first digital file segment or the at least one content feature related to the at least one content feature of the first digital file segment, the link being selectable by a user to initiate playback of the second digital file starting at the second digital file segment;

a display device; and a display controller that causes the display device to display a keyframe representing the second digital file segment of the second digital file in response to the dynamic link generator dynamically generating the link between the first digital file segment of the first digital file and the second digital file segment of the second digital file.

14. The apparatus of claim 13, further comprising a content feature determining unit that determines at least one content feature of the first digital file segment using a recognition process, and that determines at least one content feature of the second digital file segment using the recognition process; and an index generator that generates the index from the at least one feature of content of the first digital file segment and the at least one feature of content of the second digital file segment.

15. The apparatus of claim 14, wherein the digital video segmenting unit divides at least one of the first and the second digital files into a plurality of segments, each segment comprising a presentation slide, in response to the at least one of the first and second digital file being classified as a presentation digital file comprising at least one slide.

16. The apparatus of claim 14, wherein the digital video segmenting unit divides at least one of the first and the second digital files into a plurality of segments based on a temporal increment, in response to the at least one of the first and second digital file being classified as a non-presentation digital file.

17. The apparatus according to claim 13, wherein the content feature detector comprises:

a content feature receiving unit that receives a content feature selected by the user during playback of the first digital file, wherein the content feature receiving unit applies a recognition process to at least one of:
  the first digital file segment of the first digital file during which the user has paused the playback of the first digital file, or
  a region of the first digital file segment of the first digital file the user has selected using a user interface.

18. The apparatus according to claim 13, wherein the dynamic link generator dynamically generates a second link between the first digital file segment of the first digital file and the second digital file segment of the second digital file, wherein the dynamically generating the second link is performed based on metadata associated with the first digital file segment and the second digital file segment respectively, the metadata comprising at least one of: authorship information, title information, location information, date information and time information.

* * * * *